US006984596B2

(12) United States Patent
Dickerson

(10) Patent No.: US 6,984,596 B2
(45) Date of Patent: Jan. 10, 2006

(54) WIRE-REINFORCED ELASTIC WEBBING

(75) Inventor: Phillip Dickerson, High Point, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 72 days.

(21) Appl. No.: 10/273,211

(22) Filed: Oct. 17, 2002

(65) Prior Publication Data
US 2004/0077244 A1 Apr. 22, 2004

(51) Int. Cl.
D04B 21/08 (2006.01)
D04B 23/06 (2006.01)

(52) U.S. Cl. ............... 442/316; 66/169 R; 66/190; 66/192; 66/195; 66/202; 245/1; 245/2; 442/304; 442/305; 442/306; 442/312; 442/313; 442/314

(58) Field of Classification Search ........ 442/304–306, 442/316, 312–314; 66/169 R, 202, 190, 66/192, 195; 245/1, 2
See application file for complete search history.

(56) References Cited

U.S. PATENT DOCUMENTS

| 4,009,597 | A |   | 3/1977  | Wall et al. ............... 66/193 |
| 4,168,340 | A |   | 9/1979  | Buyssens et al. ........... 428/294 |
| 4,248,064 | A | * | 2/1981  | Odham ................... 66/192 |
| 4,733,545 | A | * | 3/1988  | Weinle et al. ............. 66/202 |
| 5,074,129 | A | * | 12/1991 | Matthew .................. 66/192 |
| 5,457,968 | A | * | 10/1995 | McClintock et al. ......... 66/202 |
| 5,522,240 | A |   | 6/1996  | Wall et al. ............... 66/192 |
| D380,091   | S |   | 6/1997  | Shea et al. ............... D5/3 |
| 5,843,542 | A |   | 12/1998 | Brushafer et al. .......... 428/36.1 |
| 6,155,084 | A | * | 12/2000 | Andrews et al. ............ 66/174 |
| 6,711,920 | B2 | * | 3/2004  | Akers et al. .............. 66/170 |
| 2002/0061692 | A1 |   | 5/2002  | Steckmann et al. ......... 442/229 |
| 2004/0049260 | A1 | * | 3/2004  | Dong ..................... 623/1.15 |

FOREIGN PATENT DOCUMENTS

JP 06240535 A * 8/1994

* cited by examiner

Primary Examiner—Ula Ruddock
Assistant Examiner—Jennifer Boyd
(74) Attorney, Agent, or Firm—Womble Carlyle Sandridge & Rice, PLLC; C. Roberts Rhodes

(57) ABSTRACT

A wire-reinforced webbing material is disclosed for use in furniture, bedding and the like. The webbing includes a flat knitted fabric comprised of substantially elastic yarns such as polyester. A plurality of reinforcement wires are integrally knitted into the fabric structure in a lengthwise direction. The wires may be thin-gauge titanium or titanium alloy wires. Elastomeric yarns or cards may also be integrally knitted into the fabric structure parallel to the reinforcement wires. The reinforcement wires and elastomeric cords combine with the knitted fabric to yield a webbing material having both a high tensile strength and a resilient responsiveness to applied external loads.

9 Claims, 2 Drawing Sheets

WIRE-REINFORCED ELASTIC WEBBING

BACKGROUND

1. Field of the Invention

The invention relates to fabric webbings for furniture, bedding, and the like, and particularly to a high tensile strength, wire-reinforced elastic webbing.

2. Description of the Prior Art

It is common in the bedding and furniture industries to use webbing materials in mattresses, box springs, seats and the like. These elongated lengths of webbing materials typically are a few inches wide, and typically are constructed of knit or woven synthetic filaments or yarns such as polyester or the like. These webbings typically have at least limited elasticity. Elastomeric yarns are sometimes included in the constructions of such webbings to provide a desired amount of strength and resiliency. Such webbings may be used as part of a coil-spring foundation, in a mattress or box spring, for a cushion support, or in similar applications. In these applications, a matrix of pre-stretched webbings at least partially restrain and support a plurality of pre-compressed coil springs in a distributed pattern within a support frame. Arrays of such webbings may also be used to form a direct support for a cushion or the like.

The tensile, elastic, and elongation properties of webbings used in such bedding and furniture constructions are a factor in defining the overall firmness of the underlying supports as well as the responsiveness of such systems to applied loads. Highly-elastic webbings may provide a "spongy" feel, and may have insufficient strength to be useful in supporting a cushion, to restrain coiled springs in a desired pre-compressed state, or to adequately resist or withstand applied loads. Webbings that have high tensile strengths may be relatively inelastic, but may be capable of resisting and withstanding high load conditions and adequately restraining pre-compressed coil springs in a desired arrangement. Such webbings may not, however, have sufficient resiliency to provide a desired "feel" and responsiveness to applied loads.

Therefore, there is a need for a webbing material that provides a combination of high tensile strength and resilient responsiveness to applied loads.

SUMMARY OF THE INVENTION

A wire-reinforced elastic webbing material is provided that exhibits both a high tensile strength and resilient responsiveness to applied loads. The webbing includes a flat knitted fabric structure constructed of substantially elastic yarns. The knitted fabric is comprised of a plurality of warp yarns and a plurality of weft yarns at least partially interlaced together to form a substantially flat knitted fabric having first and second lateral edges. Longitudinal reinforcement is provided in the webbing by a plurality of substantially straight metal, preferably titanium, reinforcement wires inlaid lengthwise in the knitted fabric. The inlaid reinforcement wires may be thin-gauge wires which are relatively flexible in bending, but have relatively high tensile strengths. Accordingly, wires constructed of high-strength metals such as titanium, titanium alloys, or the like are particularly desirable. In addition to the metal reinforcement wires, a plurality of substantially straight elastomeric yarns, filaments, or cords may also be inlaid lengthwise in the knitted fabric.

The combination of the metal reinforcement wires and the elastomeric members provides the knitted webbing material with a unique balance of strength and elastic responsiveness to applied loads. The metal reinforcement wires and elastomeric members are integrally knitted into the knitted fabric structure so that they interact together in the webbing when the webbing is subjected to longitudinal or transverse loads. The metal reinforcement wires limit the overall elongation of the webbing material under load, while the substantially elastic fabric and inlaid elastomeric members provide a resilient response to the applied loads.

The at least partially interlaced warp, filler, and weft yarns may be knitted together in a flat knit pattern such as by warp knitting. In one embodiment, the interlaced warp and weft yarns are polyester yarns, and may be two-ply textured polyester yarns. In one embodiment, the webbing material has a tensile strength of about 132 lbs per inch of width of the webbing material. At least one of the metal reinforcement wires may be inlaid lengthwise in the knitted fabric proximate to a first lateral edge, and at least one other of the reinforcement wires may be inlaid lengthwise in the knitted fabric proximate to the second lateral edge. These wires along the edges of the webbing material help to ensure that applied tensile loads are distributed substantially uniformly across the full width of the webbing material.

This reinforced webbing material is useful for constructing foundations for bedding, seats and the like where a balance between strength and resilient responsiveness is required. Lengths of the webbing material may be pre-stretched across a bedding or furniture frame to provide a high-strength, semi-elastic support for cushions, coil springs, or the like. A more complete description of the webbing material may be understood from a reading of the following detailed description together with the drawings.

DETAILED DESCRIPTION

Figure 1:
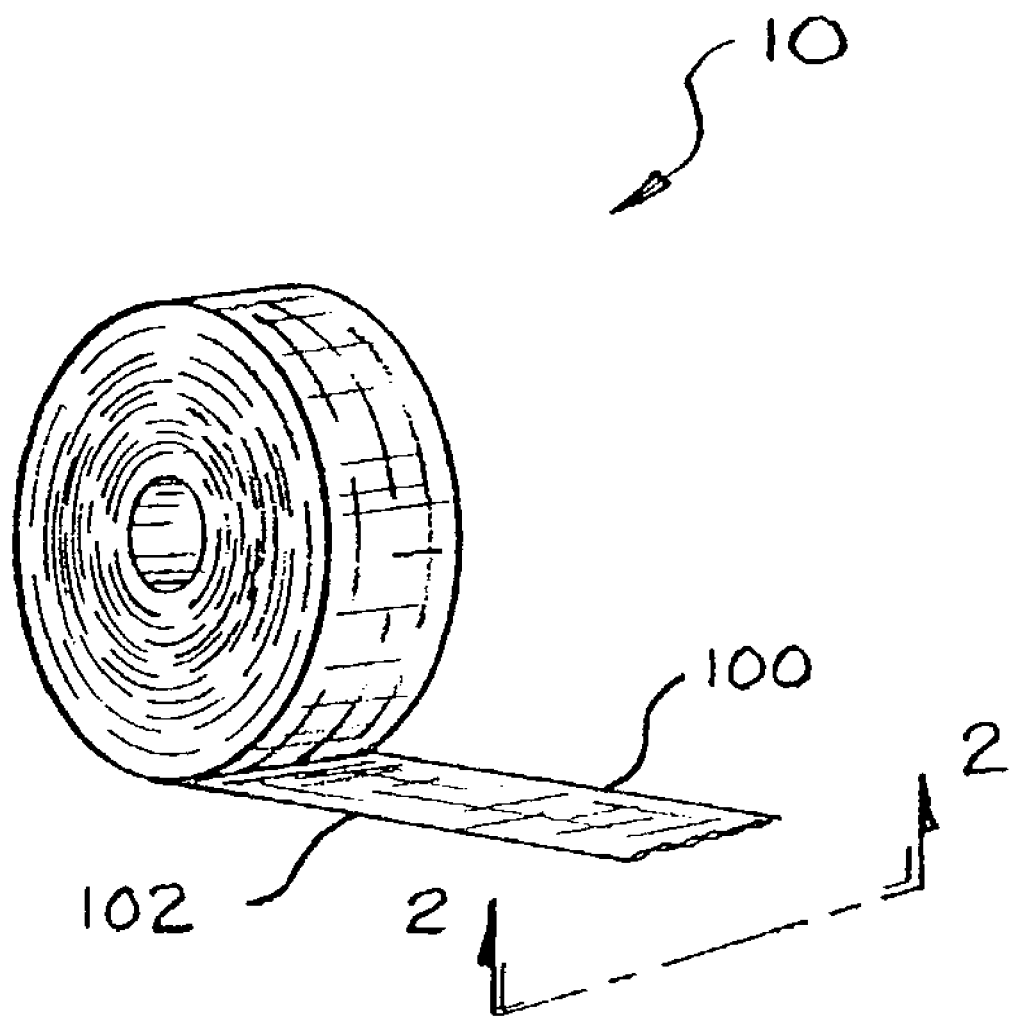
FIG. 1 is a perspective view of a roll of webbing material according to the invention.

As shown in FIG. 1, the invention provides an elongated strip of webbing material 10 that may be used in bedding, furniture, or other applications requiring a webbing material having a high tensile strength while maintaining a desirable degree of elastic or semi-elastic responsiveness under applied loads. The webbing material 10 may be provided in substantially any desired width. A typical range of widths for the webbing material 10 is about 1–6 inches, and a width of about 6 inches works well for many applications. The webbing material 10 may have a thickness of about 0.063 inch, but may be thinner or thicker depending on the desired physical properties for the reinforced webbing and the construction of knitted fabric.

Figure 2:
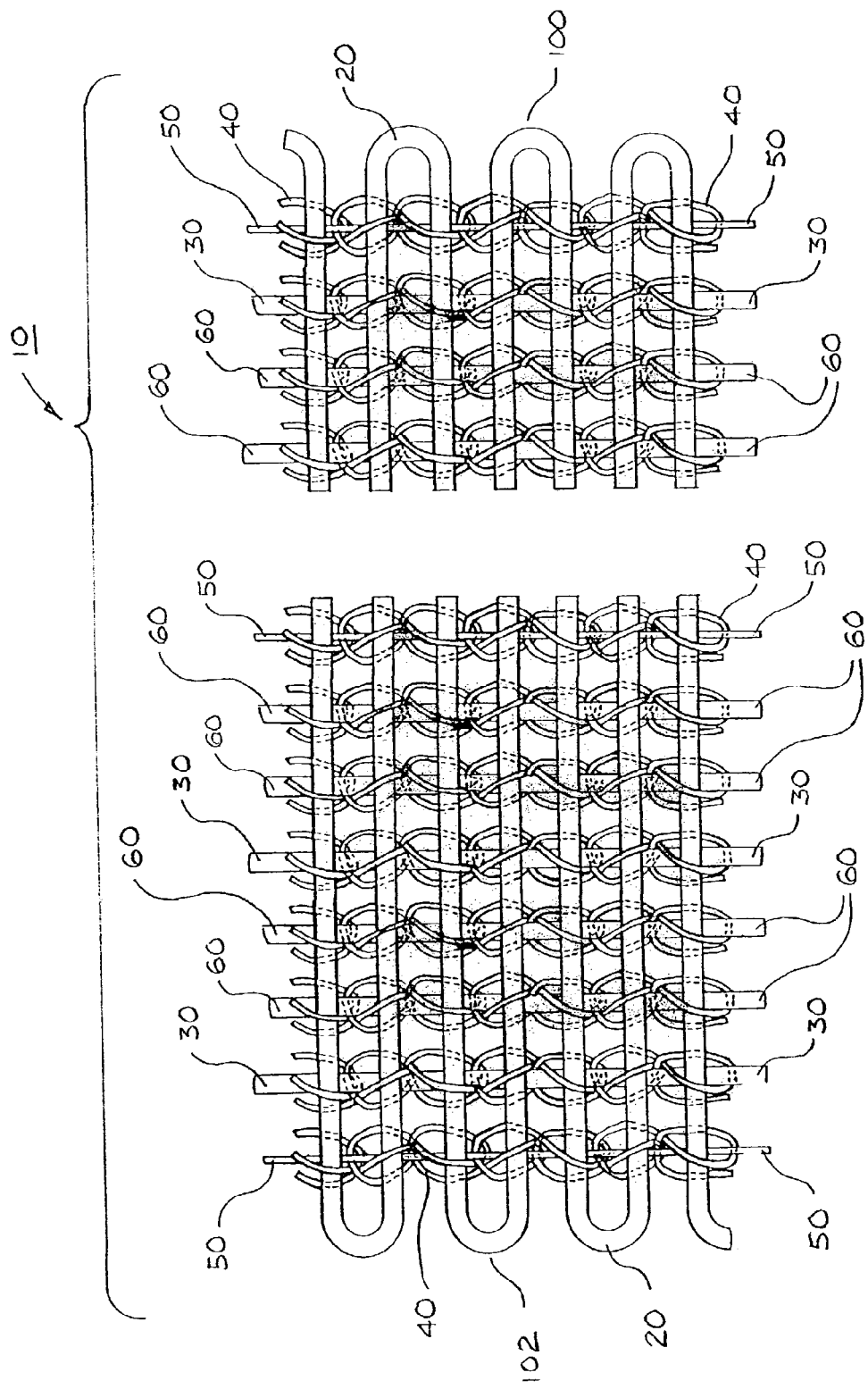
FIG. 2 is a detail plan view showing a knitted construction of one embodiment of a webbing material according to the invention taken along line 2—2 in FIG. 1.

As shown in FIG. 2, one embodiment 10 of the webbing material has a flat knitted construction. As used herein, the terms "flat knitted" and "flat knit" are used to describe and refer to a knitted fabric made on a flatbed-knitting frame as distinguished from tubular fabric made on a circular frame. One embodiment 10 of such a fabric construction is shown in FIG. 2. While the reinforced webbing 10 may be woven instead of knitted, the reinforcement wires described in detail below potentially may become bent, crimped, or otherwise damaged during weaving, thereby reducing the tensile strength of the wires. Nevertheless, a similar woven construction (not shown) can be used when adequate care is exercised during the weaving process. A flat knitted construction like that shown in FIG. 2 may be used to substantially avoid damage to the reinforcement wires during production of the webbing. The warp knit construction shown in FIG. 2 can be produced on a conventional flat knitting machine.

The embodiment of a knitted construction for the webbing 10 as shown in FIG. 2 first includes a first warp yarn 30, a second warp yarn 40, and at least one weft yarn 20. In one embodiment of the invention, the first warp yarn 30 is 2-ply 300 denier textured polyester, the second warp yarn 40 is a 2-ply 150 denier textured polyester, and the weft yarn 20 is a 2-ply 300 denier textured polyester. Elastomeric warp members 60 and wire warp members 50 are also integrated into the knitted structure in the warp or lengthwise direction to impart desired longitudinal tensile and elastic properties to the webbing 10. In this embodiment, the first warp yarns 30, elastomeric warp members 60, and wire warp members 50 are bound to the weft yarn 20 by interlaced loops formed by the second warp yarns 40.

The elastomeric warp members 60 are inlaid in the webbing in spaced, warpwise arrangement along the length of the webbing. These elastomeric warp members 60 may be comprised of an elastomeric material such as DuPont Hytrel® (a thermoplastic polyester elastomer), extruded rubber, or the like. In one embodiment, the elastomeric warp members 60 are 2350 denier mono-filament Hytrel® elastomeric cords. In a typical six-inch wide webbing, about fifty of these elastomeric warp yarns, cords, or filaments 60 are used. More or fewer elastomeric warp members 60 may be incorporated into the webbing 10 depending on the desired strength and the desired degree of stiffness and stretch for the webbing 10.

As shown in FIG. 2, metal wire warp members 50 are also inlaid in the knitted structure in a warpwise direction. It is desirable for the wire warp members 50 to be relatively thin-gauge and to have a relatively high tensile strength. In one embodiment, the wire warp members 50 are 0.011-inch diameter wire comprised of titanium or a titanium alloy. The wire material preferably has a yield strength of at least about 30,000 $lb/in^2$, and an ultimate strength of at least about 40,000 $lb/in^2$. Titanium wires having a yield strength of about 40,000 $lb/in^2$ and an ultimate strength of about 60,000 $lb/in^2$ provide an exceptionally high tensile strength in a thin-gauge wire. Other diameters and compositions of wire may also be used to impart a desired tensile properties to the webbing. A 0.011-inch diameter titanium wire that is comprised of commercially pure Grade 1 (CP1) titanium which is about 99% pure titanium has been successfully used. Such titanium alloy wire is available from G&S Titanium, Inc. of Wooster, Ohio. In a typical 6-inch wide webbing construction, six wire warp members 50 may be inlaid in spaced, lengthwise arrangement in the knitted material. In this embodiment, one wire 50 is inlaid proximate to one lateral edge 100 of the webbing 10, a second wire 50 is inlaid proximate to an opposite lateral edge 102 of the webbing, and the other four wires 50 are inlaid substantially equally-spaced between the lateral edges 100, 102 at about 1.2-inch intervals.

In one embodiment of a knitted webbing construction, the first warp yarn 30 comprises about 36% of the webbing by weight, the second warp yarn 40 comprises about 9 percent of the webbing by weight, and the weft yarn 20 comprises abut 39 percent of the webbing by weight. The elastomeric warp members 60 (about 14 percent) and wire warp members 50 (about 2 percent) make up the balance of the weight of this embodiment. Though these weight percentages define one possible construction for the webbing 10, other combinations of yarns, elastomeric members, and reinforcement wires can be used to form a webbing without departing from the invention.

The reinforcement wires 50 impart enhanced tensile strength to the webbing 10 without sacrificing a substantial amount of elasticity in the webbing. Webbing 10 constructed as described above exhibits a percent elongation in a range between about 3 percent and about 20 percent. Tensile tests indicate that webbing constructed as described above with 0.011-inch diameter titanium alloy reinforcement wires 50 can withstand about 132 lbs. of tensile force per inch of width before failure of the webbing. For six-inch wide webbing that is constructed as described above, failure of the webbing in tension occurs at about 792 lbs. of tensile force. Testing indicates that the webbing 10 may elongate to about 186% of its original length just prior to failure in tension.

Optionally, a heat fusible binder yarn (not shown) may be integrated into the knitted fabric as, for example, an additional weft yarn. The webbing can be sufficiently heated after knitting to soften and fuse the heat fusible binder yarn to the other yarns and other component members.

The various embodiments disclosed herein are provided for the purpose of explanation and example only, and are not intended to limit the scope of the appended claims. Those of ordinary skill in the art will recognize that certain modifications can be made to the described embodiments without departing from the scope of the invention. For example, though titanium or titanium alloy reinforcement wires 50 are desirable because they exhibit a high strength-to-diameter ratio, other wire materials exhibiting comparable or suitable qualities or properties also may be used. In addition, by way of example, other compositions and weights of yarns 20, 30, 40 and elastomeric members 60 other than those specifically described above may be used. Such modifications are within the scope of the claims appended hereto.

What is claimed is:

1. A webbing material comprising:
   (a) a knitted fabric structure having first and second lateral edges and comprising:
      (i) a plurality of first warp yams,
      (ii) a plurality of second yarns; and
      (iii) a plurality of first weft yarns;
   (b) a plurality of elastomeric warp yarns, filaments or cords integrally knitted into the knitted fabric structure; and
   (c) a plurality of high-strength metal warp wires having a yield strength of at least about 30,000 $lb/in^2$ and an ultimate strength of at least about 40,000 $lb/in^2$ integrally knitted into the knitted fabric structure;
      wherein the plurality of elastomeric yarns, filaments, or cords and the plurality high-strength metal warp wires are substantially straight and are substantially parallel to each other in a warpwise direction.

2. A webbing material according to claim 1 wherein the metal warp wires comprise titanium or a titanium alloy.

3. A webbing material according to claim 1 wherein the first warp yarns, the second warp yarns, and the first weft yarns comprise polyester.

4. A webbing material according to claim 1 wherein the elastomeric warp yarns comprise a thermoplastic polyester elastomer.

5. A webbing material according to claim 1 wherein the webbing material has a lengthwise tensile strength of at least 130 lbs. per inch of webbing width.

6. A webbing material according to claim 1 wherein the webbing material includes substantially elastic elongation in a warp direction between about 3 percent and about 20 percent.

7. A webbing material according to claim 1 wherein the webbing material elongates about 186 percent before failure in tension.

8. A webbing material according to claim 1 wherein at least one of the metal warp wires is integrally knitted into the knitted fabric structure proximate to the first lateral edge; and at least one other metal warp wire is integrally knitted into the knitted fabric structure proximate to the second lateral edge.

9. A reinforced webbing material comprising a knitted fabric structure of at least partially interlaced substantially elastic yarns or filaments, a plurality of substantially straight titanium or titanium alloy wires integrally knitted lengthwise in the knitted fabric structure, and a plurality of substantially straight elastomeric yarns, filaments, or cords integrally knitted in the knitted fabric structure substantially parallel to the titanium or titanium alloy wires.

* * * * *